US010090672B2

(12) United States Patent
Dickey

(10) Patent No.: US 10,090,672 B2
(45) Date of Patent: Oct. 2, 2018

(54) SHARED TRANSIENT VOLTAGE SUPPRESSOR HAVING BUILT-IN-TEST CAPABILITY FOR SOLID STATE POWER CONTROLLERS

(71) Applicant: Hamilton Sundstrand Corporation, Charlotte, NC (US)

(72) Inventor: John A. Dickey, Caledonia, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 413 days.

(21) Appl. No.: 14/956,605

(22) Filed: Dec. 2, 2015

(65) Prior Publication Data

US 2017/0163030 A1 Jun. 8, 2017

(51) Int. Cl.
*H02H 9/04* (2006.01)

(52) U.S. Cl.
CPC .............. *H02H 9/04* (2013.01); *H02H 9/041* (2013.01); *H02H 9/042* (2013.01); *H02H 9/049* (2013.01)

(58) Field of Classification Search
CPC .......... H02H 9/04; H02H 9/041; H02H 9/042; H02H 9/049
See application file for complete search history.

(56) References Cited

U.S. PATENT DOCUMENTS

| 5,543,997 A * | 8/1996 | Ruprecht ................. F16P 3/12 307/113 |
| 7,333,316 B1 | 2/2008 | Norris |
| 8,059,378 B2 | 11/2011 | Liu et al. |
| 2012/0069478 A1* | 3/2012 | Caplan ............... H01L 27/0292 361/56 |
| 2014/0306714 A1 | 10/2014 | Hess et al. |
| 2015/0022932 A1 | 1/2015 | Hasenoehrl et al. |

FOREIGN PATENT DOCUMENTS

| CN | 201699407 U | 1/2011 |
| EP | 2413502 A2 | 2/2012 |
| EP | 2790284 A1 | 10/2014 |

* cited by examiner

*Primary Examiner* — Zeev V Kitov
(74) *Attorney, Agent, or Firm* — Cantor Colburn LLP

(57) ABSTRACT

Embodiments are directed to a lightning protection circuit configured for use in a solid state power controller (SSPC) having at least one feed line and a plurality of load lines. The lightning protection circuit includes a shared transient voltage suppressor and a transient isolator communicatively coupled to the shared transient voltage suppressor. The transient isolator is configured to be communicatively coupled to the at least one feed line and the plurality of load lines. When the transient isolator is communicatively coupled to and shared by the at least one feed line and the plurality of load lines, energy above a threshold on any one of the at least one feed line and the plurality of load lines is dissipated through the shared transient voltage suppressor. A single built-in-test (BIT) circuit is provided to detect dormant failures of the shared transient voltage suppressor.

19 Claims, 7 Drawing Sheets

SHARED TRANSIENT VOLTAGE SUPPRESSOR HAVING BUILT-IN-TEST CAPABILITY FOR SOLID STATE POWER CONTROLLERS

BACKGROUND OF THE DISCLOSURE

The present disclosure relates generally to the use of transient voltage suppression (TVS) diodes to protect aircraft power control circuitry and their components from transient power surges. More specifically, the present disclosure relates to shared TVS diode-based protection schemes that facilitate the efficient and cost effective protection of solid state power controller (SSPC) components from exposure to overvoltage conditions caused by lightning-induced pulses and other transient events, while also facilitating the efficient and cost effective incorporation of built-in-test (BIT) circuitry for TVS diode failure points.

Vehicles, such as aircraft, typically include miles of wires and dozens of computers and other instruments and systems that control everything from the engines to passenger headsets. One or more power management and distribution (PMD) systems are typically provided to distribute power from a primary or secondary source to various vehicle systems. PMD systems often include so-called smart power management and distribution functionality enabled by SSPCs. In addition to providing protection for cable harnesses and loads, smart SSPCs are capable of accurately monitoring power quality and load conditions, which permit the PMD system controller to react to power fluctuations and faults automatically and in real time. SSPCs also provide wide programmability, which allows PMD systems to adapt to system reconfiguration and future equipment insertion. A typical PMD system may include hundreds or thousands of SSPCs.

Aircraft computers and electrical systems, including PMD systems and their SSPCs, must be able to safely withstand overvoltage conditions and other transients that can result from a lightning strike. Traditionally, aircraft had an aluminum skin that attenuated the lightning current induced on the wires. Some aircraft now use composite materials instead of aluminum for weight and strength benefits. However, composite materials do not provide the same level of attenuation to lightning as aluminum. When lightning occurs, hundreds of volts may surge between a load in the vehicle system and the aircraft chassis. As such, the lightning requirements of PMD systems and their SSPCs have increased.

SSPCs may use microprocessors to manage the operation of high-efficiency switching MOSFETs, which perform on/off control of the load and protect loads from short circuit and overload conditions. MOSFET gate drives can be designed to control the rise and fall time of channel currents. When these MOSFETs are subjected to lightning-induced power surges and other transients that are higher than the MOSFET voltage ratings and they are OFF, the MOSFETs break down and conduct, which typically results in the MOSFET being damaged or destroyed.

It is known how to use TVS diodes to protect the MOSFET switches of an SSPC from lightning-induced power surges and other transients. TVS diodes provide protection to MOSFETs by shunting excess current when the lightning-induced voltage exceeds the TVS diode avalanche breakdown potential. TVS diodes are, in effect, clamping devices that suppress all voltages above their breakdown voltages, and they automatically reset when the overvoltage goes away. A TVS diode may be either unidirectional or bidirectional. A unidirectional TVS diode operates as a rectifier in the forward direction like any other avalanche diode but is made and tested to handle very large peak currents. The bidirectional TVS diode clamps in both directions and can handle very large peak currents in both directions.

Known TVS diode-based protection schemes for SSPC MOSFET switches require an individual TVS diode for every SSPC output channel. As the complexity of SSPCs for aircraft applications increases, a single SSPC card can include 40 or more output channels, which, following known transient protection schemes, would require 40 individual TVS diodes per SSPC card. Additionally, although TVS diodes have sufficient functionality to provide the necessary transient protection, known TVS designs exhibit dormant failures. Existing SSPCs that utilize TVS diode-based protection transient protection schemes typically do not have a way of testing the full functionality of its protection circuitry without removing the module containing the protection circuitry from the aircraft itself or without the use of an excessive amount of BIT circuitry. Either option is not desirable. As a result, the functionality of the protection circuitry is typically determined during maintenance and assumed to be maintained until the next maintenance. Verification is then performed at the next maintenance when the module is removed from the aircraft. Hidden or dormant TVS diode failures are not immediately evident to operations and maintenance personnel as soon as they occur, so the detection of such dormant failures require a specific action (e.g., a periodic application of BIT circuitry) in order for the dormant failure to be identified. Providing the necessary BIT circuitry to test 40 or more TVS diodes per SSPC card for dormant failures is complicated, large, expensive and typically cost prohibitive.

It is therefore desirable to provide a TVS diode-based protection scheme that facilitates the simple, efficient and cost effective protection of SSPC power channels and components from exposure to overvoltage conditions caused by lightning-induced pulses and other transient events, while also facilitating the efficient and cost effective incorporation of BIT circuitry for identifying dormant TVS diode failures.

BRIEF DESCRIPTION OF THE DISCLOSURE

Embodiments are directed to a lightning protection circuit configured for use in a SSPC having at least one feed line and a plurality of load lines. The lightning protection circuit includes a shared transient voltage suppressor and a transient isolator communicatively coupled to the shared transient voltage suppressor. The transient isolator is configured to be communicatively coupled to the at least one feed line and the plurality of load lines. When the transient isolator is communicatively coupled to and shared by the at least one feed line and the plurality of load lines, energy above a threshold on any one of the at least one feed line and the plurality of load lines is dissipated through the shared transient voltage suppressor.

Embodiments are further directed to a method of forming a lightning protection circuit configured for use in a SSPC having at least one feed line and a plurality of load lines. The method includes providing a shared transient voltage suppressor, providing a transient isolator, communicatively coupling the transient isolator to the shared transient voltage suppressor and configuring the transient isolator to be communicatively coupled to and the at least one feed line and the plurality of load lines. The method further includes communicatively coupling the transient isolator to the at least one feed line and the plurality of load lines, such that energy above a threshold on any one of the at least one feed line and the plurality of load lines is dissipated through the shared transient voltage suppressor.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

Figure 1:
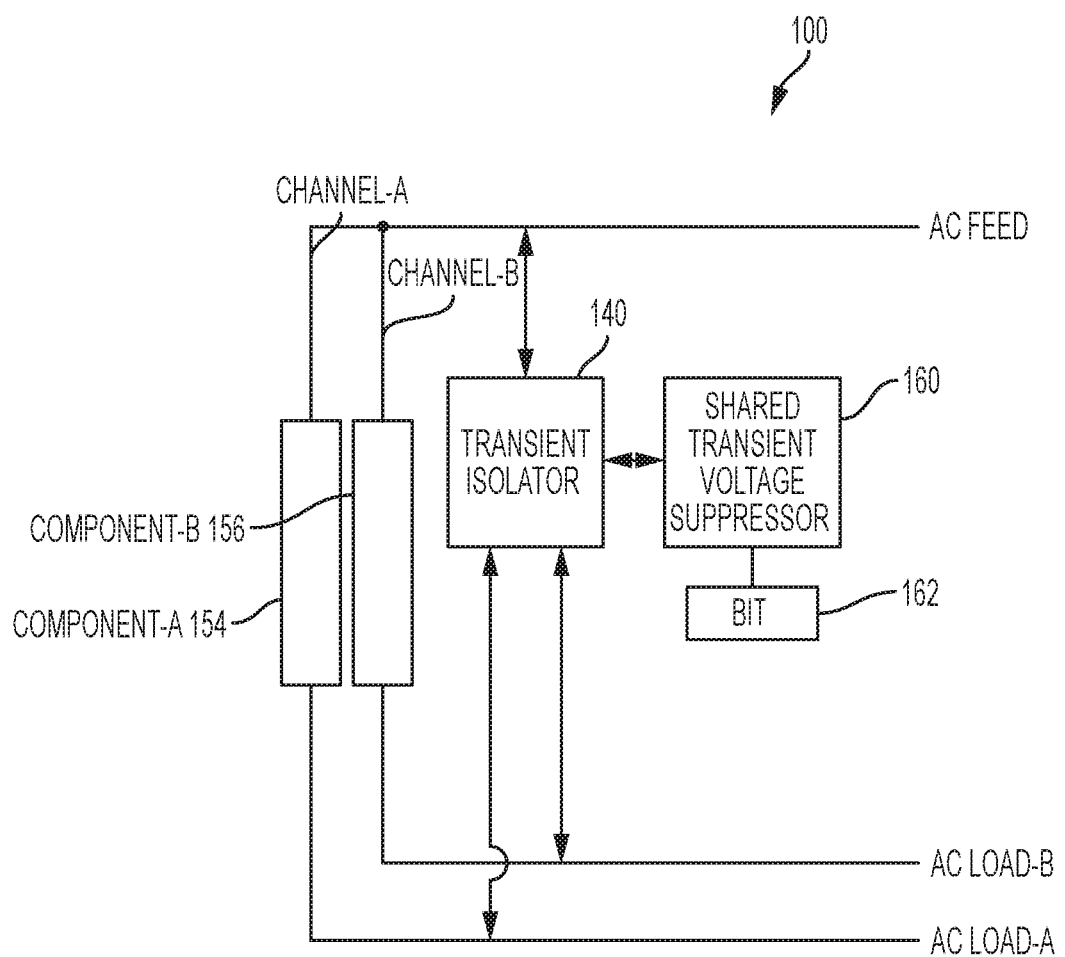
FIG. 1 depicts selected portions of a solid state power controller module having a transient isolator, a shared transient voltage suppressor and a BIT circuit according to one or more embodiments.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION OF THE DISCLOSURE

Turning now to an overview of the present disclosure, SSPCs generally include multiple power channels per SSPC card. Each power channel has an AC input feed line that is usually shared between channels of the same phase, an output AC load and a pair of power MOSFETs that switch the AC feed line voltage into and out of the AC output load. When the power MOSFETs of a given channel are subjected to a transient (e.g., a lightning induced transient) that is higher than the MOSFET voltage rating limit and they are OFF, the MOSFETs will break down and conduct and usually be damaged or destroyed. Existing transient protection/suppression systems provide transient protection but dissipate substantial energy in individual channels. As the number of channels provided on an SSPC card continues to increase, the complexity, cost and card area required to implement existing transient protection schemes continue to increase as well.

In one or more embodiment of the present disclosure, instead of providing individual TVS diodes for each power channel, a shared transient voltage suppressor is provided in communication with a transient isolator circuit coupled to the AC feed line(s) and AC load line of each individual power channel In one or more embodiments, the shared transient voltage suppressor includes a single TVS diode. In one or more embodiments, the shared transient voltage suppressor includes a plurality of simple diodes and a single TVS diode. In one or more embodiments, the shared transient voltage suppressor includes a TVS diode circuit having multiple TVS diodes, wherein the number of TVS diodes is less than the number of power channels. In any of the disclosed shared transient voltage suppressors, the reliance on TVS diodes, which provide the necessary voltage suppression functionality but exhibit dormant failure, is reduced by sharing either one or a few (i.e., less than the number of power channels) TVS diodes among a plurality of power channels.

Because the present disclosure significantly reduces the number of TVS diodes that are required to provide protection from lightning-induced and other transients, the present disclosure makes it efficient and cost effective to provide a BIT circuit to test the disclosed shared transient voltage suppressor(s) for dormant failures. The BIT signal applied to the shared transient voltage suppressor is a voltage (positive or negative) to verify the shared transient voltage suppressor is clamping at a proper value. Because of the significant reduction in the number of TVS diodes that are required to provide protection from lightning-induced and other transients, the added cost/area of providing a BIT circuit is relatively small. Additionally, for embodiments wherein the transient isolator is implemented as a configuration of simple diodes, the simple diodes prevent BIT circuit test pulses applied to the shared protection line from affecting the normal operating outputs of the channels.

Turning now to a more detailed description of the present disclosure, FIG. 1 depicts selected portions of a module 100 having a transient isolator 140, a shared transient voltage suppressor 160 and a BIT circuit 162 according to one or more embodiments. In terms of its overall functionality, module 100 may be part of a PMD system utilized to control power management and distribution on a vehicle, such as an aircraft (not shown). Under some conditions, such as a lightning strike, a transient current may surge through the vehicle. The transient current may be, for example, an induced current, other known type of transient current, or a transient current from another source besides lightning. In the disclosed example, transient isolator 140, shared transient voltage suppressor 160 and BIT circuit 162 of module 100 provide lightning protection to reduce the risk that module 100, and particularly component-A 154 and/or component-B 156, becomes damaged from the transient current. As will be appreciated from the illustrations and the following description, in accordance with one or more disclosed embodiments, transient isolator 140, shared transient voltage suppressor 160 and BIT circuit 162 of module 100 facilitate the simple, efficient and cost effective protection of SSPC power channels A and B and components thereof (e.g., 154, 156) from exposure to overvoltage conditions caused by lightning-induced pulses and other transient events, while also facilitating the efficient and cost effective incorporation of BIT circuit 162 for identifying dormant TVS diode failure points.

In one or more embodiments, which are described and illustrated later in this disclosure, each of component-A 154 and component-B 158 is implemented as a set of MOSFET switches. A gate drive (not shown) controls the turn on and turn off phases of the MOSFET switches. Without benefit of the present disclosure, some form of overvoltage clamp circuitry is typically provided with component-A 154 and component-B 156. However, transient isolator 140 and shared transient voltage suppressor 160 make overvoltage clamp circuitry for each of component-A 154 and component-B 156 unnecessary.

Module 100 couples AC power from at least one AC FEED through multiple power channels to multiple loads. For ease of illustration, only one AC FEED, only two power channels (Channel-A and Channel-B) and two loads (AC LOAD-A and AC LOAD-B) are shown. In the present disclosure, a description of the operations of one AC FEED and one channel applies equally to all AC FEEDs and all channels. Channel-A transmits power from the AC FEED through component-A 154 to AC LOAD-A. Component-A 154 may be, for example, a pair of switches that control the coupling of AC power on AC FEED into AC LOAD-A. Lightning strikes can result in transients through Channel-A that exceed the operating range of component-A 154.

Lightning-induced transients may occur as a positive or a negative pulse above/below a threshold on the feed line side of Channel-A, or as a positive or negative pulse above/below a threshold on the load side of Channel-A. Transient isolator 140 diverts a positive or a negative transient above/below a threshold (e.g., the voltage rating limits of the channel MOSFETS) from the AC FEED line through shared transient voltage suppressor 160, which dissipates the positive/negative transients. For positive transients from AC FEED, shared transient voltage suppressor 160 may dissipate the transient through ground (not shown). For negative transients from AC FEED, shared transient voltage suppressor 160 may dissipate the transient from ground and back through transient isolator 140. For positive transients from AC LOAD-A, shared transient voltage suppressor 160 may dissipate the transient through ground (not shown). For negative transients from AC LOAD-A, shared transient voltage suppressor 160 may dissipate the transient from ground and back through transient isolator 140. Accordingly, transient isolator 140 and shared transient voltage suppressor 160 are coupled to and shared by Channel-A and Channel-B. Transient isolator 140 and shared voltage suppressor 160 are also coupled to and shared by the multiple AC FEEDs to provide feed-to-feed isolation and shared transient voltage suppression for 3 phase operation.

In one or more embodiments, transient isolator 140 may be implemented as a diode-based bridge rectifier having multiple simple diode branches bridged by shared transient voltage suppressor 160. Accordingly, transient isolator 140 when implemented as a diode bridge rectifier provides the same polarity of output for either polarity of input. Example diode bridge rectifier implementations of transient isolator 140 are shown in FIG. 3-7 (e.g., simple diodes 242A, 242B, 242C, 242D, 246A, 246B, positive clamp rail 302 and negative clamp rail 304) and described in greater detail later in this disclosure.

In one or more embodiments, the shared transient voltage suppressor includes a single TVS diode. In one or more embodiments, the shared transient voltage suppressor includes a plurality of simple diodes and a single TVS diode. In one or more embodiments, the shared transient voltage suppressor includes a TVS diode circuit having multiple TVS diodes, wherein the number of TVS diodes is less than the number of power channels. In any of the disclosed shared transient voltage suppressors, the reliance on TVS diodes, which provide the necessary voltage suppression functionality but exhibit dormant failure, is reduced by sharing either one or a few (i.e., less than the number of power channels) TVS diodes among a plurality of power channels.

Because the present disclosure significantly reduces the number of TVS diodes that are required to provide protection from lightning-induced and other transients, it is now efficient and cost effective to provide BIT circuit 162 to test shared transient voltage suppressor 160 for dormant failures. A number of methods can be employed to provide BIT circuit 162 including the use of a step up transformer, wherein a pulse is applied to the primary and a much higher voltage pulse is created from the secondary and coupled to shared transient suppressor 160 (e.g., a TVS diode) to cause it to momentarily conduct. This conduction may be picked up by a differential peak voltage detector as shared voltage suppressor 160 clamps the energy pulse from the transformer. The primary of the transformer may be coupled to the pulse generator through a capacitor to limit the energy of the pulse. Because the present disclosure requires only one or a few TVS diodes to provide protection from lightning-induced and other transients, the added cost/area for BIT circuit 162 is relatively small. Additionally, for embodiments wherein transient isolator 140 is implemented as a diode bridge rectifier, the simple diodes of transient isolator 140 may be configured to prevent BIT circuit test pulses applied to shared transient suppressor 160 from affecting the normal operating outputs of the channels.

Figure 2:
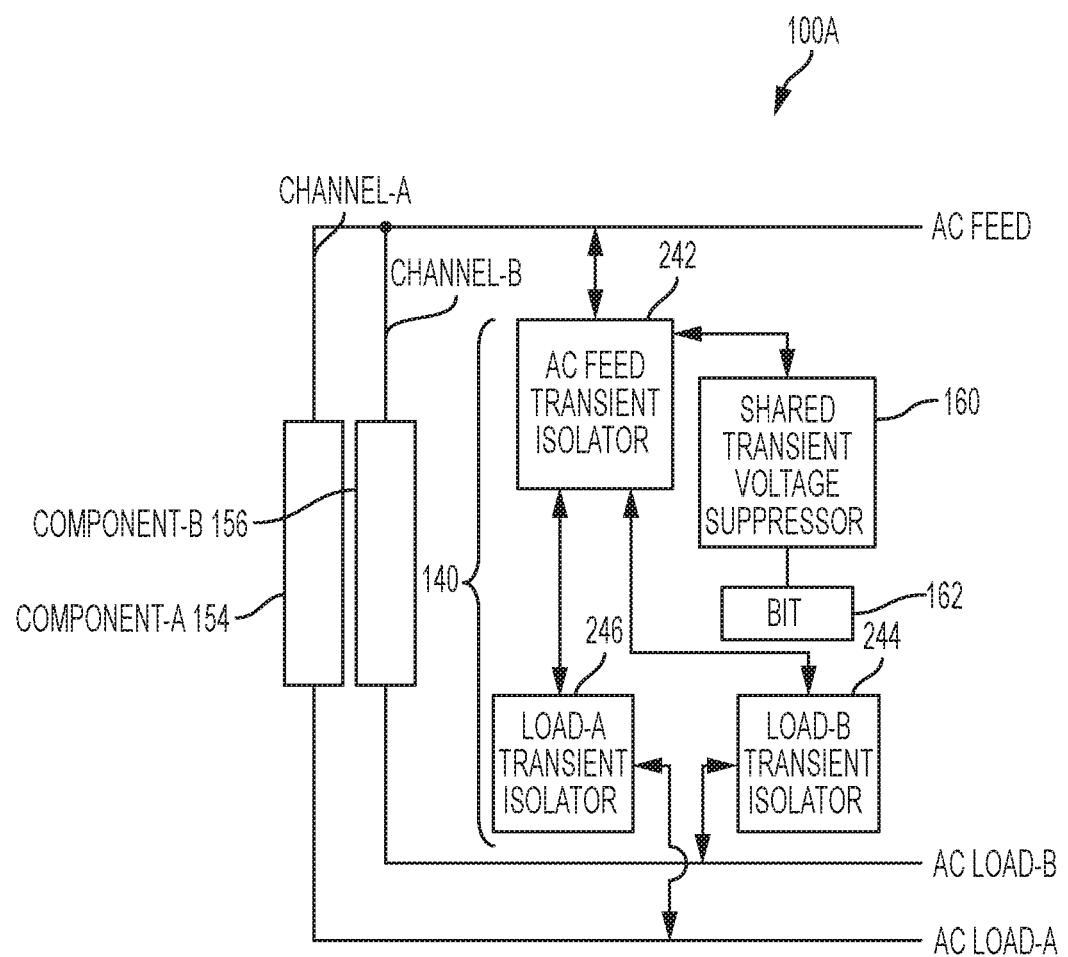
FIG. 2 depicts selected portions of a solid state power controller module having an AC FEED transient isolator, LOAD isolators, a shared transient voltage suppressor and a BIT circuit according to one or more embodiments.

FIG. 2 depicts selected portions of a module 100A, which is substantially the same as module 100 shown in FIG. 1 except transient isolator 140 is implemented as an AC FEED transient isolator 242, a LOAD-B transient isolator 244 and a LOAD-A transient isolator 246, configured and arranged as shown. AC FEED transient isolator 242 diverts positive and negative transients from the AC FEED line to shared transient voltage suppressor 160. LOAD-A transient isolator 246 and AC FEED transient isolator 242 divert positive and negative transients on the AC LOAD-A line to shared transient voltage suppressor 160. LOAD-B transient isolator 244 and AC FEED transient isolator 242 divert positive and negative transients on the AC LOAD-B line to shared transient voltage suppressor 160. In one or more embodiments, AC FEED transient isolator 242, LOAD-A transient isolator 246 and LOAD-B transient isolator 244 may be implemented as a diode-based bridge rectifier having multiple simple diode branches bridged by shared transient voltage suppressor 160. Accordingly, AC FEED transient isolator 242, LOAD-A transient isolator 246 and LOAD-B transient isolator 244 when implemented as a diode bridge rectifier provides the same polarity of output for either polarity of input. Example diode bridge rectifier implementations of AC FEED transient isolator 242, LOAD-A transient isolator 246 and LOAD-B transient isolator 244 are shown in FIG. 3-7 (e.g., simple diodes 242A, 242B, 242C, 242D, 246A, 246B, positive clamp rail 302 and negative clamp rail 304) and described in greater detail later in this disclosure.

Accordingly, instead of incurring the expense, reduced card space, increased energy consumption and increased complexity of providing individual TVS diodes for Channel-A and Channel-B, shared transient voltage suppressor 160 is provided in communication with transient isolator 140 coupled to and shared by the AC FEED line, the AC LOAD-A line and the AC LOAD-B line. In one or more embodiments, shared transient voltage suppressor 160 includes a single or a few (i.e., less than the number of channels) TVS diodes. In any of the disclosed embodiments of shared transient voltage suppressor 160, the reliance on TVS diodes, which provide the necessary transient suppression functionality but exhibit dormant failure, is reduced by sharing either one or a few TVS diodes among a plurality of power channels. Because the present disclosure significantly reduces the number of TVS diodes that are required to provide protection from lightning-induced and other transients, it is now efficient and cost effective to provide BIT circuit 162 to test shared transient voltage suppressor 160 for dormant failures. Because the present disclosure requires only one or a few TVS diodes to provide protection from lightning-induced and other transients, the added cost/area for BIT circuit 162 is relatively small.

Figure 3:
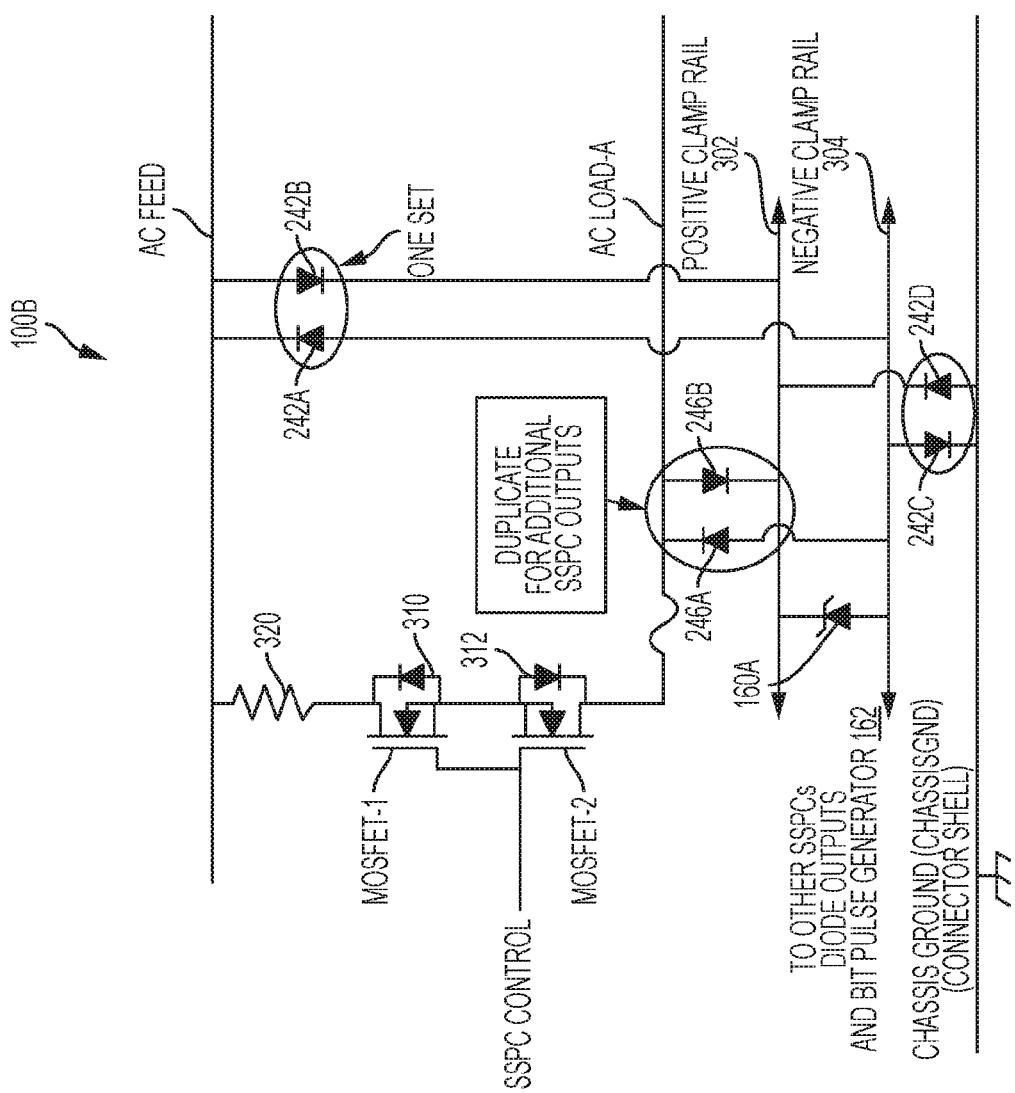
FIG. 3 depicts selected portions of a solid state power controller module having an AC FEED transient isolator, LOAD isolators, a shared transient voltage suppressor and a BIT circuit according to one or more embodiments.

FIG. 3 depicts an exemplary implementation of a module 100B, which is a more detailed implementation of modules 100 and 100A shown in FIGS. 1 and 2. Module 100B focuses on the AC FEED line and the AC-LOAD-A line, however the same operations occur for the AC FEED line and any channel of module 100B. Module 100B of FIG. 3 corresponds to module 100 of FIG. 1 in the following manner. Component-A 154 of FIG. 1 is implemented as MOSFET-1, MOSFET-2 and resistor 320, configured and arranged as shown in FIG. 3. Transient isolator 140 of FIG. 1 is implemented as simple diodes 242A, 242B, 242C, 242D, 246A, 246B, positive clamp rail 302 and negative clamp rail 304, configured and arranged as shown in FIG. 3. Shared transient voltage suppressor 160 is implemented as shared TVS diode 160A.

Figure 4:
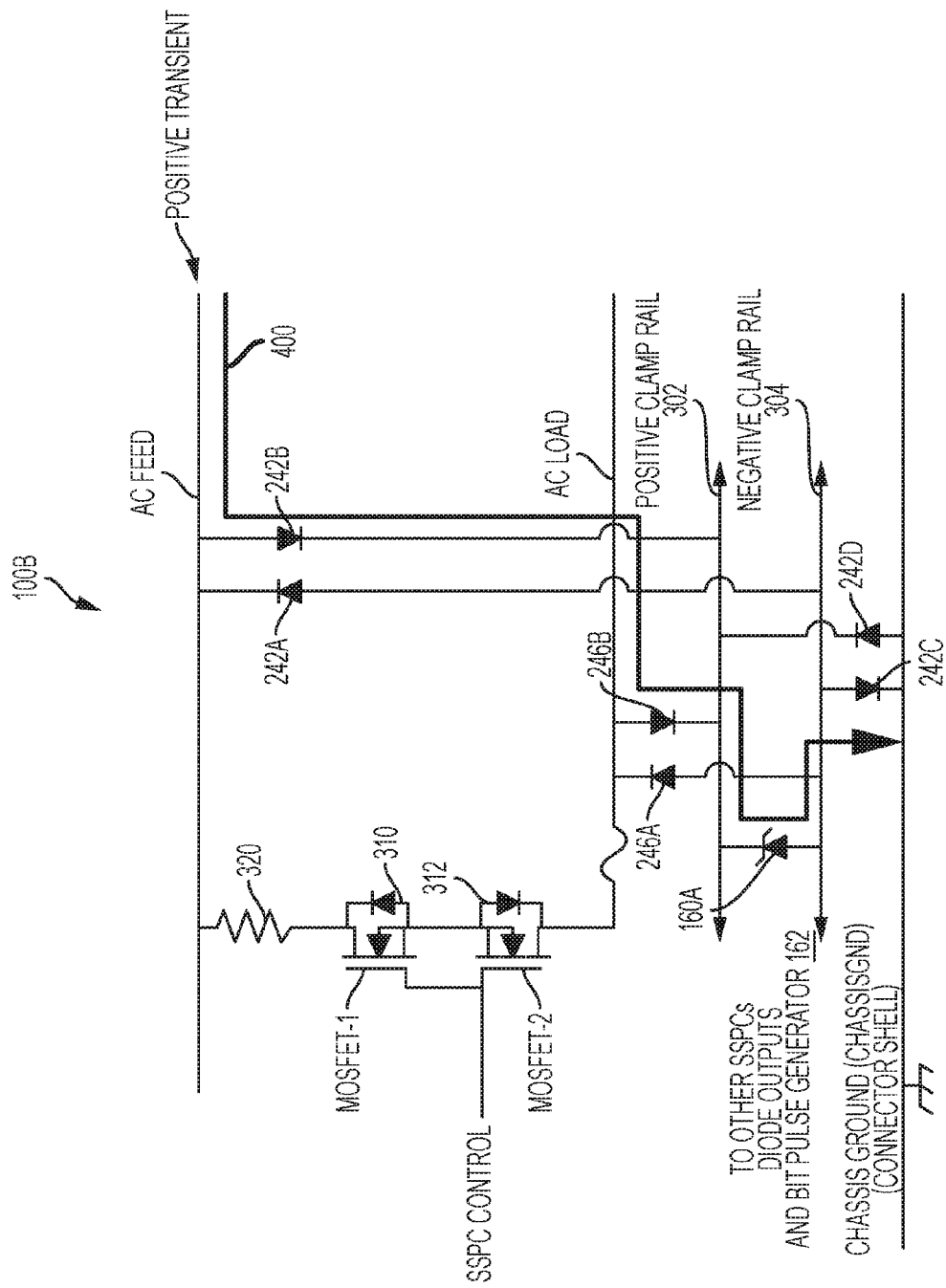
FIG. 4 depicts the current path induced by a positive transient on the AC FEED of the module shown in FIG. 3.
Figure 5:
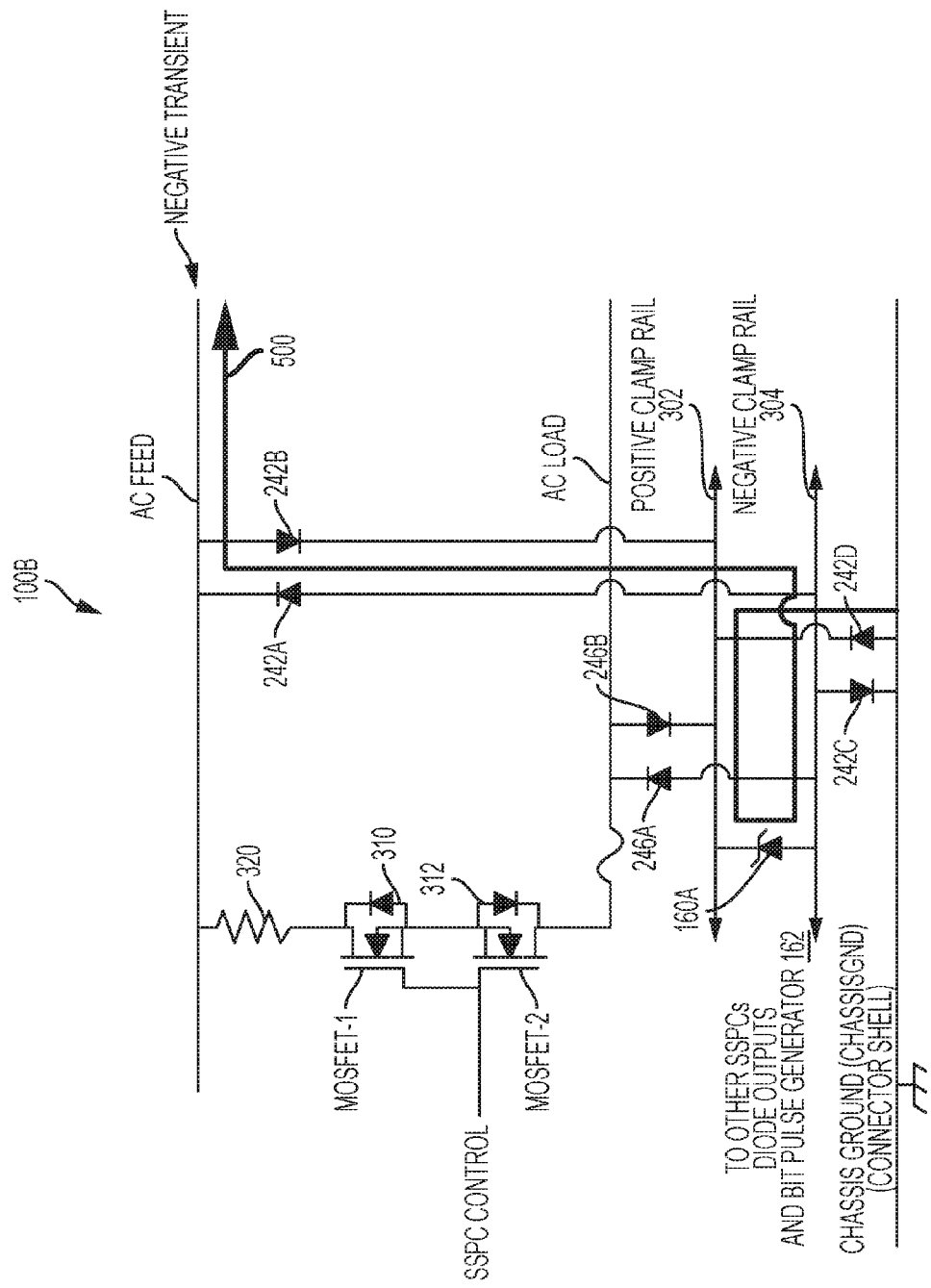
FIG. 5 depicts the current path induced by a negative transient on the AC FEED of the module shown in FIG. 3.
Figure 6:
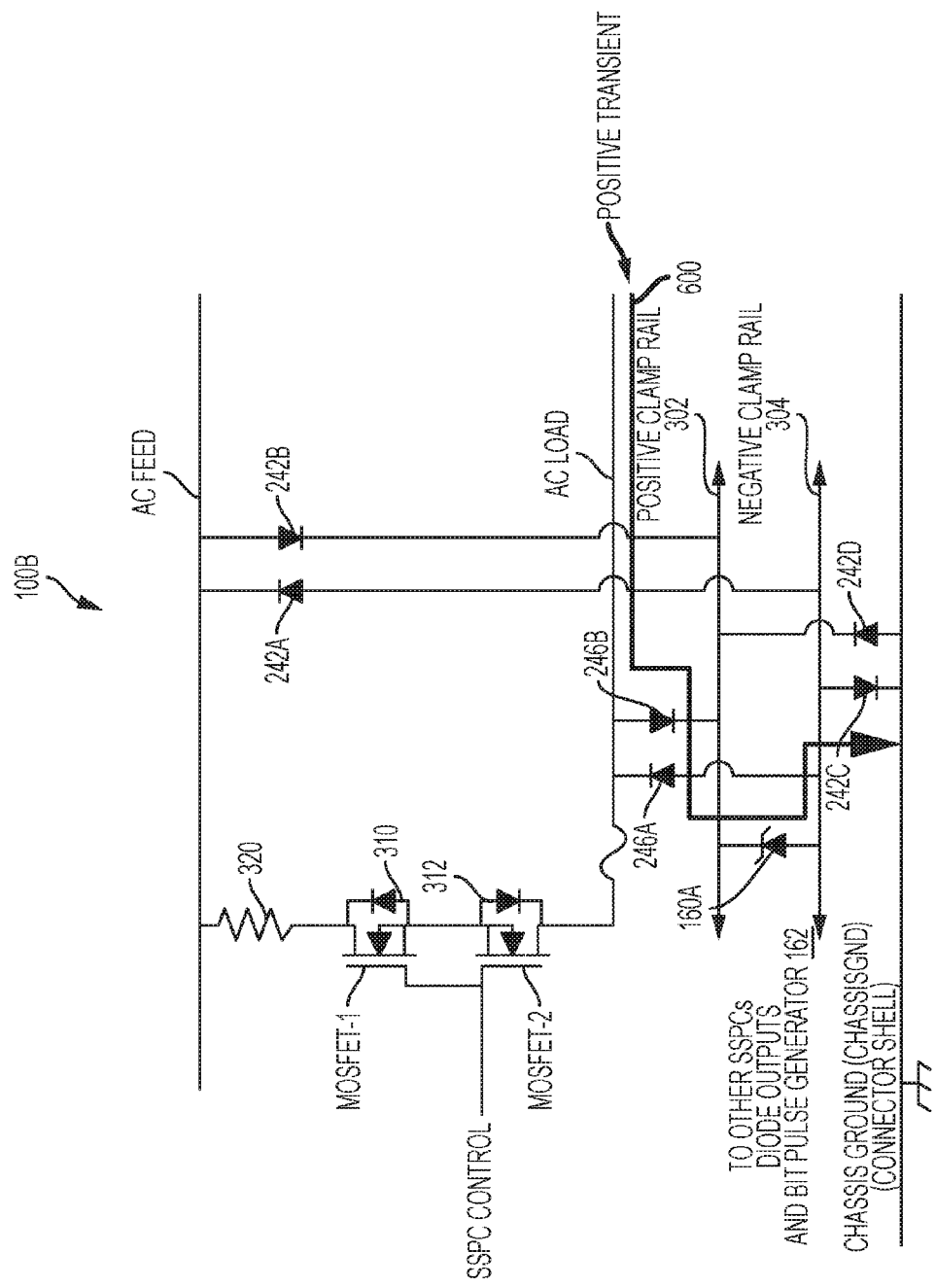
FIG. 6 depicts the current path induced by a positive transient on the AC LOAD-A line of the module shown in FIG. 3.
Figure 7:
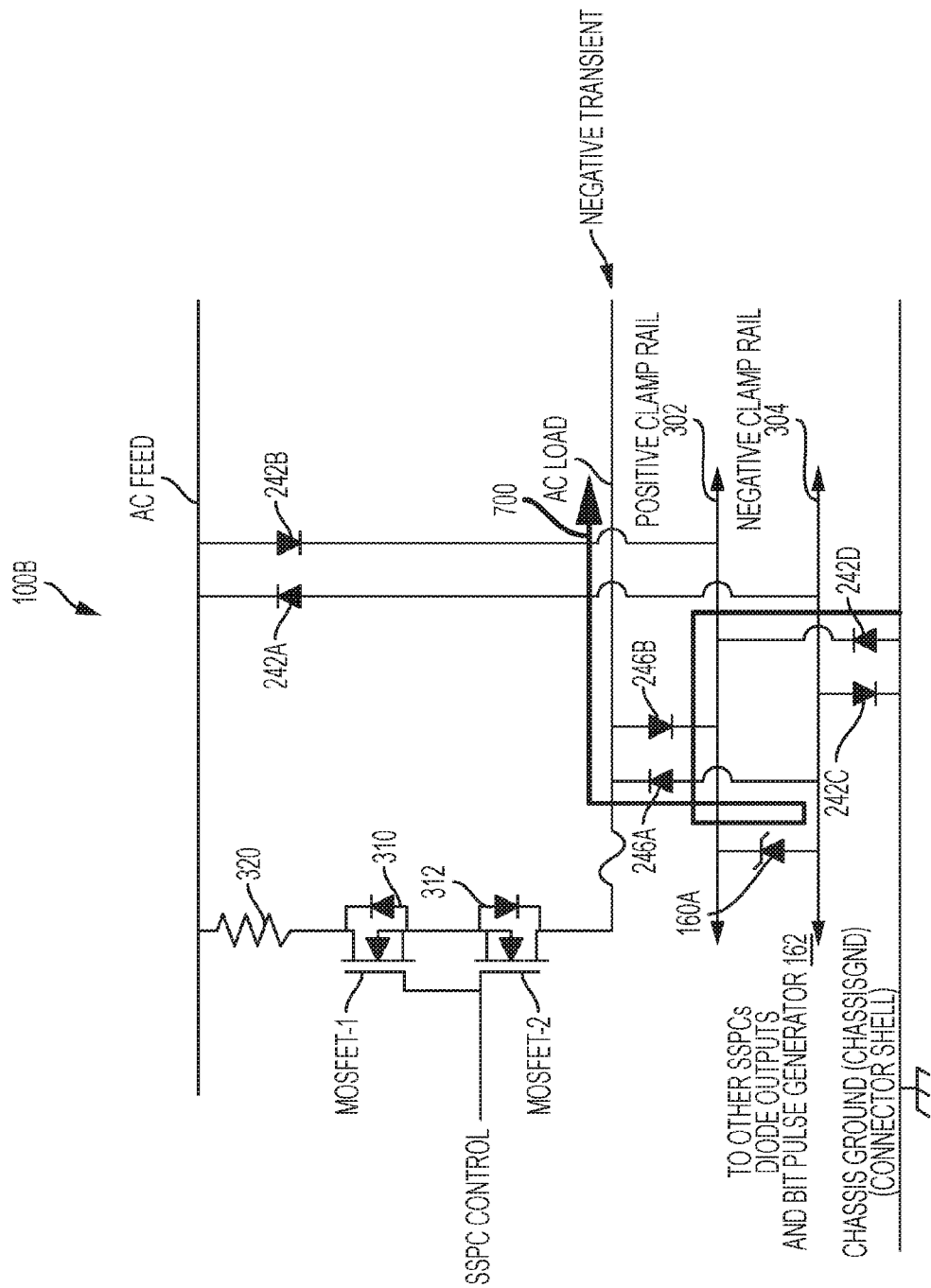
FIG. 7 depicts the current path induced by a negative transient on the AC LOAD-A line of the module shown in FIG. 3.

FIGS. 4-7 depict examples of how positive and negative transients are dissipated by module 100B in accordance with the present disclosure. More specifically, FIG. 4 depicts a current path 400 induced by a positive transient on the AC LOAD line of module 100B. FIG. 5 depicts a current path 500 induced by a negative transient on the AC LOAD line of module 100B. FIG. 6 depicts a current path 600 induced by a positive transient on the AC LOAD-A line of module 100B. Finally, FIG. 7 depicts a current path 600 induced by a negative transient on the AC LOAD-A line of module 100B.

As shown in FIG. 4, current path 400 is first diverted through simple diode 242B to positive clamp rail 302, through positive clamp rail 302 to shared TVS diode 160A, down through shared TVS diode 160A, back through negative clamp rail 304, down through simple diode 242C and out to Chassis Ground (Chassisgnd).

As shown in FIG. 5, current path 500 is negative so it draws current up from Chassisgnd, through simple diode 242D to positive clamp rail 302, through positive clamp rail 302 to shared TVS diode 160A, down through shared TVS diode 160A, back through negative clamp rail 304 and up through simple diode 242A.

As shown in FIG. 6, current path 600 is first diverted down through simple diode 246B to positive clamp rail 302, through positive clamp rail 302 to shared TVS diode 160A, down through shared TVS diode 160A, back through negative clamp rail 304, down through simple diode 242C and out to Chassis Ground (Chassisgnd).

As shown in FIG. 7, current path 700 is negative so it draws current up from Chassisgnd, through simple diode 242D to positive clamp rail 302, through positive clamp rail 302 to shared TVS diode 160A, down through shared TVS diode 160A, back through negative clamp rail 304 and up through simple diode 246A.

Accordingly, one or more embodiments of the present disclosure uses at least one shared TVS diode and a rectifying bridge configuration of simple diodes to divert lightning-induced pulse energy into the shared TVS diode while maintaining the operating voltage below the breakdown voltages of the SSPC MOSFET switches. The shared TVS diode may be selected at a voltage that is well below the damage level for the MOSFETs and well above the normal maximum operating voltage. The power rating of the shared TVS diode is selected according to the required lightning protection requirements and levels.

Thus, one or more embodiment of the present disclosure provide systems and methodologies wherein positive and negative transient energy (e.g., energy induced by a lightning strike) on either the feed line or on one of the load lines is channeled into a shared transient voltage suppressor, which may be implemented in its simplest form as the disclosed shared TVS diode. Because only one or a few shared TVS diodes are required for transient suppression in the disclosed configurations, the shared transient voltage suppressor can be efficiently and cost effectively tested at regular intervals using an onboard BI'T circuit to assure that the shared transient voltage suppressor has no dormant failure.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure.

Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A lightning protection circuit configured for use in a solid state power controller (SSPC) comprising at least one feed line and a plurality of load lines, the lightning protection circuit comprising:
   a power metal oxide semiconductor field effect transistor (MOSFET) communicatively coupled to the at least one feed line and at least one of the plurality of load lines, wherein the power MOSFET is configured to switch voltage on the feed line into and out of the at least one of the plurality of load lines;
   a shared transient voltage suppressor communicatively coupled between a positive clamp rail and a negative clamp rail; and
   a transient isolator communicatively coupled to the shared transient voltage suppressor;
   wherein the transient isolator is configured to be communicatively coupled to the positive clamp rail, the negative claim rail, the at least one feed line and the plurality of load lines;
   wherein, when the transient isolator is communicatively coupled to and shared by the at least one feed line and the plurality of load lines, and when the power MOSFET is off while energy above a breakdown voltage of the power MOSFET is on the at least one feed line or the at least one of the plurality of feed lines, the energy above the breakdown voltage on any one of the at least one feed line and the plurality of load lines is dissipated in the following manner;
   if the energy above the breakdown voltage comprises energy of a positive transient pulse on the one load line, the energy of the positive transient pulse is dissipated through the following path:
   through the a first diode of the transient isolator to the positive clamp rail;
   through the positive clamp rail to the shared transient voltage suppressor;
   through the shared transient voltage compressor to the negative clamp rail;
   through the negative clamp rail to a second diode of the transient isolator; and
   through the second diode to the ground.

2. The circuit of claim 1, wherein the lightning protection circuit further comprises:
   a built-in-test (BIT) circuit communicatively coupled to the shared transient voltage suppressor and configured to test the shared transient voltage suppressor to detect a dormant failure of the shared transient voltage suppressor.

3. The circuit of claim 1, wherein the transient isolator comprises a diode bridge rectifier.

4. The circuit of claim 3, wherein the diode bridge rectifier comprises:
   the first diode communicatively coupled from one of the plurality of load lines to the positive clamp rail;
   the second diode communicatively coupled between the ground and the negative clamp rail;
   a third diode communicatively coupled from the feed line to a positive clamp rail; and
   a fourth diode communicatively coupled from the feed line to a negative clamp rail.

5. The circuit of claim 4, wherein, if the energy above the breakdown voltage comprises energy of a positive transient pulse on the feed line, the energy of the positive transient pulse on the feed line is dissipated through the following path:
   through the third diode to the positive clamp rail;
   through the positive clamp rail to the shared transient voltage suppressor;
   through the shared transient voltage compressor to the negative clamp rail;
   through the negative clamp rail to the second diode; and
   through the second diode to the ground.

6. The circuit of claim 4, wherein, if the energy above the breakdown voltage comprises energy of a negative transient pulse on the feed line, the energy of the negative transient pulse on the feed line is dissipated through the following path:
   from the ground up through the fourth diode to the positive clamp rail;
   through the positive clamp rail to the shared transient voltage suppressor;
   through the shared transient voltage compressor to the negative clamp rail;
   through the negative clamp rail to the fifth diode; and
   through the fifth diode to the feed line.

7. The circuit of claim 4, wherein the diode bridge rectifier further comprises, for each of the plurality of channels:
   a fifth diode communicatively coupled from the feed line to the negative clamp rail; and
   a sixth diode communicatively coupled from the negative clamp rail to the one of the plurality of load lines.

8. The circuit of claim 7, wherein, if the energy above the breakdown voltage comprises energy of a negative transient pulse on the one load line, the energy of the negative transient pulse on the load line is dissipated through the following path:
   from the ground up through the fourth diode to the positive clamp rail;
   through the positive clamp rail to the shared transient voltage suppressor;
   through the shared transient voltage compressor to the negative clamp rail;
   through the negative clamp rail to the sixth diode; and
   through the sixth diode to the one load line.

9. A method of forming a lightning protection circuit configured for use in a solid state power controller (SSPC) comprising at least one feed line and a plurality of load lines, the method comprising:
   providing a power metal oxide semiconductor field effect transistor (MOSFET) communicatively coupled to the at least one feed line and at least one of the plurality of load lines, wherein the power MOSFET is configured to switch voltage on the feed line into and out of the at least one of the plurality of load lines;
   providing a shared transient voltage suppressor communicatively coupled between a positive clamp rail and a negative clamp rail;
   providing a transient isolator;
   communicatively coupling the transient isolator to the shared transient voltage suppressor;
   configuring the transient isolator to be communicatively coupled to by the at least one feed line and the plurality of load lines; and
   communicatively coupling the transient isolator to the at least one feed line and the plurality of load lines, such that, when the power MOSFET is off while energy above a breakdown voltage of the power MOSFET is on the at least one feed line or the at least one of the plurality of feed lines, the energy above the breakdown voltage on any one of the at least one feed line and the plurality of load lines is dissipated in the following manner:
   if the energy above the breakdown voltage comprises energy of a positive transient pulse on the one load line, the energy of the positive transient pulse is dissipated through the following path:
through the a first diode of the transient isolator to the positive clamp rail;
through the positive clamp rail to the shared transient voltage suppressor;
through the shared transient voltage compressor to the negative clamp rail;
through the negative clamp rail to a second diode of the transient isolator; and
through the second diode to the ground.

10. The method of claim 9 further comprising:
providing a built-in-test (BIT) circuit;
communicatively coupling the BIT circuit to the shared transient voltage suppressor; and
configuring the BIT circuit to test the shared transient voltage suppressor to detect a dormant failure of the shared transient voltage suppressor.

11. The method of claim 9 further comprising:
providing the transient isolator as a diode bridge rectifier.

12. The method of claim 11, wherein providing the diode bridge rectifier comprises:
providing the first diode communicatively coupled from one of the plurality of load lines to the positive clamp rail;
providing the second diode communicatively coupled between the ground and the negative clamp rail;
providing a third diode communicatively coupled from the feed line to a positive clamp rail; and
providing a fourth diode communicatively coupled from the feed line to a negative clamp rail.

13. The method of claim 12, wherein, if the energy above the breakdown voltage comprises energy of a positive transient pulse on the feed line, the energy of the positive transient pulse on the feed line is dissipated through the following path:
through the third diode to the positive clamp rail;
through the positive clamp rail to the shared transient voltage suppressor;
through the shared transient voltage compressor to the negative clamp rail;
through the negative clamp rail to the second diode; and
through the second diode to the ground.

14. The method of claim 12, wherein, if the energy above the breakdown voltage comprises energy of a negative transient pulse on the feed line, the energy of the negative transient pulse on the feed line is dissipated through the following path:
from the ground up through the fourth diode to the positive clamp rail;
through the positive clamp rail to the shared transient voltage suppressor;
through the shared transient voltage compressor to the negative clamp rail;
through the negative clamp rail to the fifth diode; and
through the fifth diode to the feed line.

15. The method of claim 12, wherein providing the diode bridge rectifier further comprises, for each of the plurality of channels:
providing a fifth diode communicatively coupled from the feed line to the negative clamp rail; and
providing a sixth diode communicatively coupled from the negative claim rail to the one of the plurality of load lines.

16. The method of claim 15, wherein, if the energy above the breakdown voltage comprises energy of a negative transient pulse on the one load line, the energy of the negative transient pulse on the one load line is dissipated through the following path:
from the ground up through the fourth diode to the positive clamp rail;
through the positive clamp rail to the shared transient voltage suppressor;
through the shared transient voltage compressor to the negative clamp rail;
through the negative clamp rail to the sixth diode; and
through the sixth diode to the one load line.

17. A lightning protection circuit configured for use in a solid state power controller (SSPC) comprising at least one feed line and a plurality of load lines, the lightning protection circuit comprising:
a power metal oxide semiconductor field effect transistor (MOSFET) communicatively coupled to the at least one feed line and at least one of the plurality of load lines, wherein the power MOSFET is configured to switch voltage on the feed line into and out of the at least one of the plurality of load lines;
a shared transient voltage suppressor communicatively coupled between; and
a transient isolator communicatively coupled to the shared transient voltage suppressor;
wherein the transient isolator is configured to be communicatively coupled to the positive clamp rail, the negative claim rail, the at least one feed line, and the plurality of load lines;
wherein, when the transient isolator is communicatively coupled to and shared by the at least one feed line and the plurality of load lines, and when the power MOSFET is off while energy above a breakdown voltage of the power MOSFET is on the at least one feed line or the at least one of the plurality of feed lines, the energy above the breakdown voltage on any one of the at least one feed line and the plurality of load lines is dissipated through the shared transient voltage suppressor.

18. The circuit of claim 17, wherein the lightning protection circuit further comprises a built-in-test (BIT) circuit communicatively coupled to the shared transient voltage suppressor and configured to test the shared transient voltage suppressor to detect a dormant failure of the shared transient voltage suppressor.

19. The circuit of claim 17, wherein the transient isolator comprises a diode bridge rectifier.

* * * * *